United States Patent
Hara et al.

(10) Patent No.: US 7,782,643 B2
(45) Date of Patent: Aug. 24, 2010

(54) MATRIX CONVERTER APPARATUS

(75) Inventors: Hidenori Hara, Kitakyushu (JP); Eiji Yamamoto, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 326 days.

(21) Appl. No.: 11/911,545

(22) PCT Filed: Apr. 7, 2006

(86) PCT No.: PCT/JP2006/307436

§ 371 (c)(1),
(2), (4) Date: Oct. 15, 2007

(87) PCT Pub. No.: WO2006/112275

PCT Pub. Date: Oct. 26, 2006

(65) Prior Publication Data

US 2009/0059633 A1 Mar. 5, 2009

(30) Foreign Application Priority Data

Apr. 15, 2005 (JP) ............................. 2005-117995

(51) Int. Cl.
*H02M 5/00* (2006.01)
*H02H 7/10* (2006.01)
(52) U.S. Cl. ........................................ 363/148; 363/50
(58) Field of Classification Search ............. 363/34–37, 363/50–53, 55, 56.01, 148, 152
See application file for complete search history.

(56) References Cited

U.S. PATENT DOCUMENTS 5,852,559 A * 12/1998 Li ................................ 363/163

(Continued)

FOREIGN PATENT DOCUMENTS

DE 297 01 914 U1 5/1997

(Continued)

OTHER PUBLICATIONS

Chinese Office Action dated Jul. 24, 2009.

(Continued)

*Primary Examiner*—Matthew V Nguyen
(74) *Attorney, Agent, or Firm*—Sughrue Mion, PLLC

(57) ABSTRACT

There is provided a matrix converter apparatus including both functions of outputting a step up voltage and outputting a step down voltage. In a matrix converter apparatus for directly connecting respective phases of a three phase alternating current power source (1) and respective phases of an output side by a bidirectional switch constituted by IGBT transistors or the like connected reversely in parallel therewith, controlling to output an alternating current power source voltage by a PWM control based on an output voltage instruction, and outputting an arbitrary direct current or alternating current voltage, respective reactors (61), (62), (63) inserted to be connected between the respective phases of the polyphase alternating current power source 1 and the bidirectional switches are included, and by controlling to ON/OFF the bidirectional switches, terminals of two or more of the reactors on a side of the bidirectional switch are shortcircuited, and thereafter opened to thereby step up an output voltage of the matrix converter apparatus. Further, when the terminals are switched from being shortcircuited to being opened, conduction paths of currents flowing in the respective reactors which have been shortcircuited are ensured by controlling to ON/OFF the bidirectional switch group (5) and a capacitor group (7).

20 Claims, 8 Drawing Sheets

U.S. PATENT DOCUMENTS

| | | | |
|---|---|---|---|
| 5,949,672 A * | 9/1999 | Bernet | 363/159 |
| 6,166,930 A | 12/2000 | Czerwinski | |
| 6,566,764 B2 | 5/2003 | Rebsdorf et al. | |
| 6,654,260 B2 * | 11/2003 | Okayama et al. | 363/37 |
| 2008/0285314 A1 * | 11/2008 | Kojori | 363/37 |

FOREIGN PATENT DOCUMENTS

| | | |
|---|---|---|
| DE | 101 35 337 A1 | 2/2003 |
| JP | 2-206364 A | 8/1990 |
| JP | 7-44834 B2 | 5/1995 |
| JP | 11-18489 A | 1/1999 |
| JP | 2000-69754 A | 3/2000 |
| JP | 2004-274906 A | 9/2004 |
| JP | 2005-65357 A | 3/2005 |

OTHER PUBLICATIONS

German Office Action dated Jul. 10, 2009.
Korean Office Action dated Aug. 21, 2009.

* cited by examiner

FIG. 8

|     | (a)   | (b)           |
|-----|-------|---------------|
| Gru | R - U | U - R = R - U |
| Grv | R - V | U - S = S - U |
| Grw | R - W | U - T = T - U |
| Gsu | S - U | V - R = R - V |
| Gsv | S - V | V - S = S - V |
| Gsw | S - W | V - T = T - V |
| Gtu | T - U | W - R = R - W |
| Gtv | T - V | W - S = S - W |
| Gtw | T - W | W - T = T - W |

MATRIX CONVERTER APPARATUS

TECHNICAL FIELD

The present invention relates to a matrix converter apparatus for outputting an arbitrary polyphase alternating current or direct current voltage by constituting an input thereof by a polyphase alternating current power source, which is a matrix converter apparatus having a step up/step down function of the output voltage.

RELATED ART

A power converting apparatus generally signifies an apparatus of converting an alternating current power source voltage constituting a fixed voltage/a fixed frequency into a voltage/a frequency having arbitrary magnitudes. A currently most generally used power converting apparatus is a PWM inverter of a voltage source type. A PWM inverter subjects a direct current voltage provided by converting an alternating current power source voltage to PWM switching by using a high speed semiconductor switching element of IGBT or the like to output from alternating current voltage converted into an arbitrary voltage/frequency.

However, as a basic characteristic of the PWM converter, there is pointed out a disadvantage that a power source cannot be regenerated to a side of the alternating current power source and input current harmonics are considerable. As a countermeasure thereagainst, there is a type by providing a circuit similar to a switching portion of the PWM inverter also at an input side converter portion (PWM converter+PWM inverter). However, in this case, there poses a problem that a number of elements of IGBT and the like are doubled, further, a control apparatus of the PWM converter portion is also needed.

Hence, there is a matrix converter apparatus to which attention is paid in recent years as a power converting apparatus resolving the problems. The matrix converter apparatus is an AC-AC direct power converting apparatus capable of converting a three phase alternating current power source directly to an arbitrary voltage/frequency. As a main characteristic, there is pointed out an advantage that both operations of motor driving/regeneration can be carried out, power source harmonics can be restrained, there is not a portion of converting to a direct current voltage, and therefore, small-sized formation/low price formation of a total of the apparatus can be realized. The matrix converter apparatus is a new drive apparatus to which attention is paid in recent years particularly in a field in which an environment of use of energy conservation/low noise or the like is severe.

Meanwhile, the matrix converter apparatus is generally constructed by a constitution in which since the alternating current power source voltage is directly subjected to high speed switching, an LC filter for smoothing an input current is provided at an input portion. According to the matrix converter apparatus, by arbitrarily selecting an alternating current power source phase and subjecting the phase to PWM control and controlling a conduction rate thereof, an arbitrary voltage output smaller than an input voltage value (accurately speaking, a terminal voltage of a filter portion capacitor C) of the phase is realized. Therefore, a step down operation is on the premise in principle, and therefore, the output voltage cannot be stepped up. However, although it is necessary to supply an output voltage higher than the input power source voltage to a load side in accordance with use thereof, the general matrix converter apparatus cannot deal with such a step up use.

However, there is a matrix converter apparatus realizing a step up operation while adopting the constitution of the matrix converter apparatus by resolving the problem (refer to, for example, Patent Reference 1). FIG. 9 specifically shows the apparatus as a background art.

In FIG. 9, a magnetic energy is stored to a reactor 102 having a constitution of a transformer by making, for example, both of switches S101 and S104 ON, successively, the magnetic energy is discharged by making the switch S104 OFF and the discharged magnetic energy is charged to a capacitor 106 to thereby realize to step up an output voltage to thereby simultaneously realize a three phase alternating current voltage output to a motor 109. In this way, the one apparatus serves as step up type DC/DC converter apparatus and inverter apparatus.

Patent Reference 1: JP-A-2000-69754 (FIG. 1)

DISCLOSURE OF THE INVENTION

Problems to be Solved by the Invention

When the magnetic energy stored in the reactor is discharged for stepping up the voltage, it is necessary to ensure a path of conducting a current flowing in the reactor also in being discharged. When the current flowing in the reactor is shut off without ensuring the conducting path, a large surge voltage (also constituting large generated noise) is generated when the current is shut off and there is a concern of destructing a semiconductor switching element constituting a bidirectional switch.

According to the background art shown in FIG. 9, the reactor 102 of a transformer structure is used as a countermeasure thereagainst, for example, a path of conducting a current flowing in, for example, a winding N1 is ensured by the switch S101 and the capacitor 106, and a current flowing in a winding N2 is shut off to be zero, however, a corresponding amount of a magnetic flux amount is instantaneously shifted to the winding N1 by using the transformer structure to thereby prevent the hazard from being brought about.

However, it is necessary to adopt a special transformer structure product for the reactor, at the bidirectional switch on the side of the winding of receiving the instantaneously shifted magnetic flux amount, a current is doubled instantaneously, and therefore, it is necessary to increase a current capacity of the semiconductor switching element, with regard to the current supplied from the alternating current power source side, there also poses a problem that a variation in the current is excessively violent. Further, owing to a constitution in which currents flowing in windings of respective rectors mutually interfere with each other, there poses a problem that the currents flowing in the windings of the respective reactors cannot be controlled separately and independently.

Further, there also poses a problem that a so-to-speak step down operation of controlling the alternating current power source phase by PWM and controlling the conduction rate to thereby realize the arbitrary voltage output smaller than the input voltage value of the phase cannot be carried out by the constitution.

The invention has been carried out in view of the problem and it is an object thereof to provide a matrix converter apparatus capable of realizing to step up output voltage by using a standard reactor, restraining an abrupt change in a current flowing in a bidirectional switch, individually controlling currents flowing in respective reactors and simultaneously realizing also a step down operation.

Means for Solving the Problems

In order to resolve the problem, according to claim 1, there is provided with a matrix converter apparatus for directly connecting respective phases of an alternating current power source and respective phases of an output side by a bidirectional switch having a self arc suppression function, controlling to output a voltage of the alternating current power source based on an output voltage instruction by a PWM control and outputting an arbitrary direct current or alternating current voltage, the matrix converter apparatus including:

respective reactors inserted to be connected between the respective phases of the alternating current power source and the bidirectional switches;

a circuit of stepping up an output voltage of the matrix converter apparatus by shortcircuitting terminals of the two or more of reactors on a side of the bidirectional switch by controlling the bidirectional switches ON/OFF and thereafter opening the bidirectional switch; and a circuit of ensuring respective conduction paths of currents flowing in the respective reactors which have been shortcircuited when the terminals are switched from being shortcircuited to being opened.

First, the alternating current power source is shortcircuited by way of the reactor by making the bidirectional switch ON, thereby, a magnetic energy is increased to accumulate at inside of the reactor, the magnetic energy is discharged in accordance with making the bidirectional switch OFF thereafter, and a step up voltage output of the matrix converter apparatus is realized by discharging the energy. Further, the circuit of ensuring the conduction paths ensures the conduction paths of the currents flowing in the respective reactors which have been shortcircuited even in being discharged, and therefore, a continuity of the currents flowing in the respective reactors can be ensured, and a step up operation without bringing about a surge voltage or the like can be realized.

According to claim 2, there is provided with the matrix converter apparatus, wherein the circuit of ensuring the conduction paths includes:

a first capacitor group for connecting respective phases on an output side of the matrix converter apparatus, and the bidirectional switches.

The conduction paths of the currents flowing in the respective reactors which have been shortcircuited are ensured by a cooperative operation of charging/discharging the currents to and from the capacitors constituting the first capacitor group and the switch sequence of the bidirectional switches.

According to claim 3, there is provided with a matrix converter apparatus for directly connecting respective phases of an alternating current power source and respective phases on an output side by a bidirectional switch having a self arc suppression function, controlling to output a voltage of the alternating current power source by a PWM control based on an output voltage instruction, and outputting an arbitrary direct current or alternating current voltage, the matrix converter apparatus including:

respective reactors inserted to be connected between the respective phases of the alternating current power source and the bidirectional switches;

a first capacitor group for connecting the respective phases of the output side of the matrix converter apparatus;

a first connecting/disconnecting circuit capable of connecting/disconnecting a connection between capacitors constituting the first capacitor group; and a first switching apparatus for bringing the first connecting/disconnecting circuit into an ON state when a step up voltage of the matrix converter apparatus is outputted, and for bringing the first connecting/disconnecting circuit into an OFF state when a step down voltage is outputted.

In stepping up, the first connecting/disconnecting means is brought into the ON state, the first capacitor group can be charged and discharged to thereby realize the step up output, in stepping down, the first connecting/disconnecting means is brought into the OFF state to cut connection between the capacitors constituting the first capacitor group and a connecting state of a normal and general matrix converter apparatus is realized.

Further, when the output voltage is stepped down signifies an operation when the alternating current power source phase is controlled by the PWM control and a conduction rate is controlled to thereby realize an arbitrary voltage output smaller than an input voltage value of the phase.

According to claim 4, there is provided with the matrix converter apparatus, wherein the first connecting/disconnecting circuit includes:

a first rectifying diode group connected to a full-wave rectifying circuit constitution; and a first semiconductor switching element connected between positive and negative output terminals of the first rectifying diode group, terminals on one side of the respective capacitors constituting the first capacitor group are connected to respective terminals of the respective reactors on a side of the bidirectional switch, and terminals thereof on the other side are connected to respective series connecting portions of the first rectifying diode group.

By constituting the first connecting/disconnecting circuit by the electronic type connecting/disconnecting circuit, the step up operation can instantaneously be switched to the step down operation, or the step down operation can instantaneously be switched to the step up operation in actual operation.

According to claim 5, there is provided with a matrix converter apparatus for directly connecting respective phases of an alternating current power source and respective phases on an output side by a bidirectional switch having a self arc suppression function, controlling to output a voltage of the alternating current power source by a PWM control based on an output voltage instruction and outputting an arbitrary direct current or alternating current voltage, the matrix converter apparatus including:

a second capacitor group for connecting respective terminals of respective reactors on a side of the bidirectional switch;

a second connecting/disconnecting circuit capable of connecting/disconnecting a connection between capacitors constituting the second capacitor group; and a second switching apparatus for bringing the second connecting/disconnecting circuit into an OFF state when a step up voltage of the matrix converter apparatus is outputted, and for bringing the second connecting/disconnecting circuit into an ON state when a step down voltage is outputted.

In stepping down, the second connecting/disconnecting circuit is brought into the ON state to thereby enable to charge/discharge the second capacitor group, the step down output is realized while ensuring the continuity of the alternating current power source current, and in stepping up, the second connecting/disconnecting circuit is brought into the OFF state to thereby cut the connection between the capacitors constituting the second capacitor group. By cutting the connection between the capacitors, the operation of shortcircuitting the bidirectional switch is prevented.

According to claim 6, there is provided with the matrix converter apparatus, wherein the second connecting/disconnecting circuit includes:

a second rectifying diode group connected to a full-wave rectifying circuit constitution; and a second semiconductor switching element connected between positive and negative output terminals of the second rectifying diode group, terminals on one side of respective capacitors constituting the second capacitor group are connected to respective phase terminals on an output side of the matrix converter apparatus, and terminals thereof on the other side are connected to respective series connecting portions of the second rectifying diode group.

By constituting the second connecting/disconnecting circuit by the electronic type connecting/disconnecting circuit, the step up operation can instantaneously be switched to the step down operation or the step down operation can instantaneously be switched to the step up operation in actual operation.

According to claim 7, there is provided with the matrix converter apparatus, wherein a direct current power source is substituted for the alternating current power source. Because operation and effect provided to the invention are not limited to those of the case of only the alternating current power source but even in the case of the direct current power source, operation and effect similar to those of the case of the alternating current power source are achieved.

According to claim 8, there is provided with the matrix converter apparatus, wherein a direct current power source is substituted for the alternating current power source, and a reactor inserted to be connected between either one of a positive terminal side and a negative terminal side of the direct current power source and the bidirectional switches are substituted for the respective reactors.

In consideration of the fact that it is not necessary to smooth the input current since the input power source is constituted by the direct current power source and also shortcircuitting the power source for stepping up is limited only to shortcircuitting between the positive and negative terminals of the direct current power source, the respective reactors arranged at the respective phases of the alternating current power source are arranged only at either one of the positive terminal side and the negative terminal side of the direct current power source.

According to claim 9, there is provided with the matrix converter apparatus, further including:

a detecting voltage switching apparatus for detecting the output voltage of the matrix converter apparatus when a step up voltage is outputted, and for detecting the alternating current power source voltage when a step down voltage is outputted.

In the stepping up operation, the output voltage of the matrix converter apparatus constitutes the direct control object, and therefore, it is necessary to detect the output voltage. The output voltage of the matrix converter apparatus is constituted by the pulse width modulating type voltage, and therefore, it is easier to indirectly detecting the output side voltage in accordance with the pulse width control information by detecting the input side voltage than detecting directly the output side voltage in the step down operation.

According to claim 10, there is provided with the matrix converter apparatus, further including:

a detecting current switching apparatus for detecting an input current to the matrix converter apparatus when a step up voltage is outputted, and for detecting an output current from the matrix converter apparatus when a step down voltage is outputted.

In the stepping down operation, the invention is suitable also for a vector control for directly controlling the output current of the matrix converter apparatus, and in the stepping up operation, it is necessary to control the input current for controlling the step up output voltage.

According to claim 11, there is provided with the matrix converter apparatus, further including:

a gate signal outputting portion for outputting a gate signal based on an output voltage instruction; and a gate signal switching apparatus for changing to switch respective corresponding relationships between the bidirectional switch and the gate signal when a step down voltage is outputted and when a step up voltage is outputted.

In switching the stepping up and stepping down modes, it is necessary to switch the signal to the bidirectional switch, however, by providing the gate signal switching apparatus, special control switching is dispensed with.

Effects of the Invention

According to the invention, there is achieved an effect of capable of realizing the matrix converter apparatus capable of outputting the alternating current voltage of an arbitrary voltage/arbitrary frequency realizing to step up the output voltage by using the standard reactor, further, providing both of the step up outputting function and the step down outputting function, capable of dealing with outputting the step down voltage, outputting the step up voltage and the regenerating operation to the power source side by a single piece of the matrix converter apparatus, and capable of instantaneously switching the step up and step down operations even in the actual operation.

Further, in the step up operation, the rapid change of the current flowing in the bidirectional switch can be restrained, the surge voltage can be restrained from being brought about, and therefore, there is achieved an effect of capable of reducing a current capacity of the semiconductor switching element of the IGBT transistor or the like constituting the bidirectional switch and capable of preventing destruction of the semiconductor switching element.

BRIEF DESCRIPTION OF THE DRAWINGS

FIG. 8 is a diagram showing a method of distributing a specific gate signal in switching a control mode.

Figure 1:
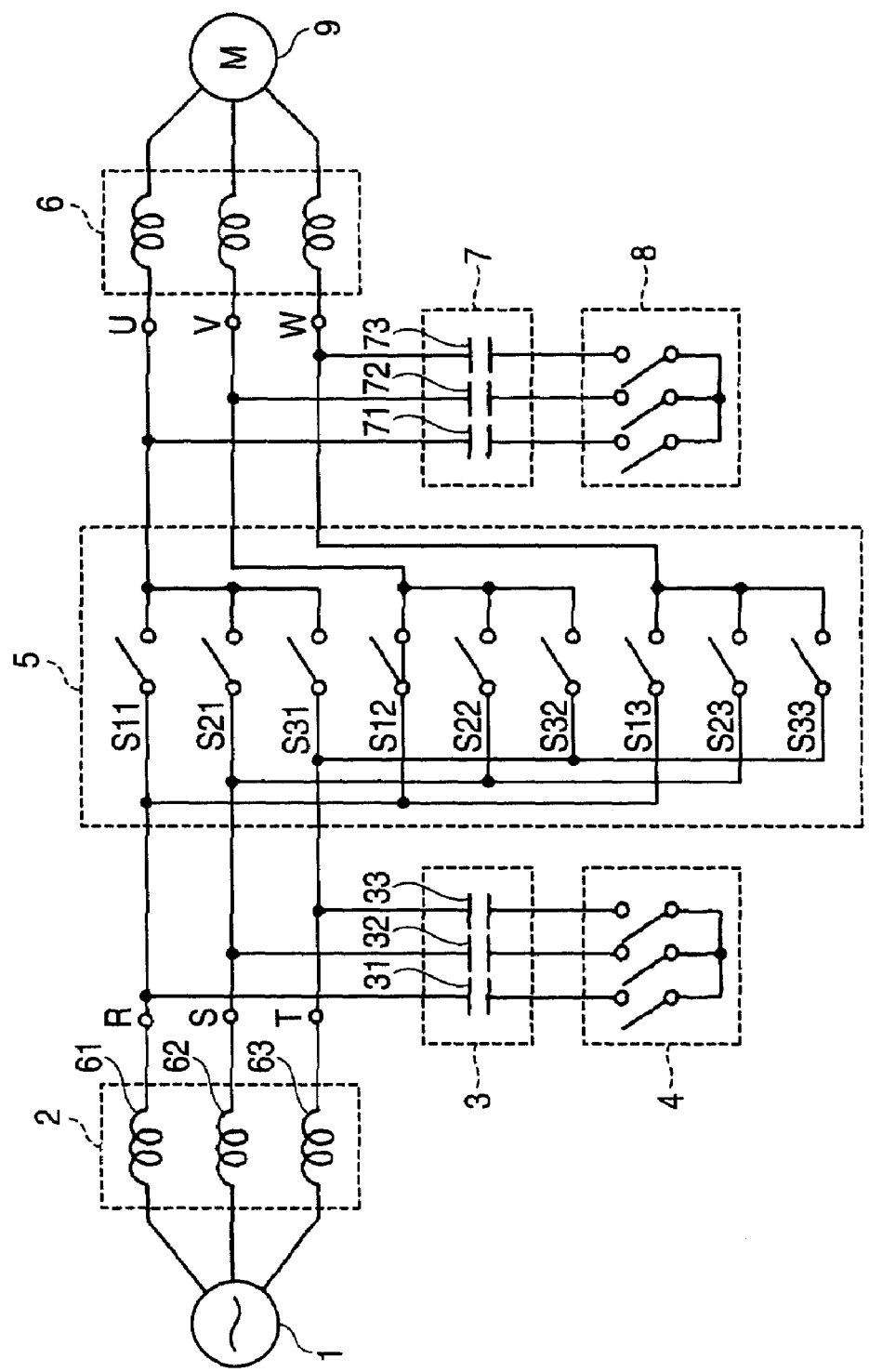
FIG. 1 is a constitution diagram of a matrix converter apparatus showing a first embodiment of the invention.

DESCRIPTION OF REFERENCE NUMERALS AND SIGNS 1 three phase alternating current power source
2 input side reactor
3 second capacitor group
4 second connecting/disconnecting means
5 bidirectional switch group
6 output side reactor
7 first capacitor group
8 first connecting/disconnecting means
9 motor
10 direct current power source
11 essential portion of matrix converter apparatus
12 mechanical type switch
13 electronic type switch
14-1 current detecting signal 1
14-2 current detecting signal 2
14-3 current detecting signal 3
15-1 voltage detecting signal 1
15-2 voltage detecting signal 2
15-3 voltage detecting signal 3
16 changeover switch
17 gate signal group
18 changeover switch
31, 32, 33 capacitors
61, 62, 63 input side respective phase reactors
71, 72, 73 capacitors
101 single phase alternating current power source
102 reactor of transformer structure
105 bidirectional switch group
106, 107, 108 capacitors
109 motor

BEST MODE FOR CARRYING OUT THE INVENTION

Respective embodiments of the invention will be explained in reference to the drawings as follows.

Embodiment 1

FIG. 1 shows a constitution of a matrix converter apparatus including the respective reactors 2 on an input side inserted to be connected between the three phase alternating current power source 1 and the bidirectional switch group 5 constituted by IGBT transistors or the like, the first capacitor group 7 for connecting respective phases on an output side, the first connecting/disconnecting means 8 capable of connecting/disconnecting connections among the respective capacitors constituting the first capacitor group 7, the second connecting/disconnecting means 4 capable of connecting/disconnecting connections among the respective capacitors constituting the second capacitor group 3, the respective reactors 6 on an output side inserted to be connected between respective phases on the output side and the motor 9, as a first embodiment of the invention.

Further, although in the embodiment of FIG. 1, the reactor 6 is inserted to be connected, a winding inductance provided to the motor can substitute therefor by eliminating the reactor 6.

First, when the first connecting/disconnecting means is opened and the second connecting/disconnecting means is closed, this constitutes a constitution of a general matrix converter apparatus of a background art. An LC filter is constituted on the input side by the respective reactors 2 and the second capacitor group 3 to thereby realize a continuous and smooth input current waveform supplied from the side of the alternating current power source. Further, owing to a constitution of directly controlling voltages across terminals of the second capacitor group 3 by the bidirectional switch group 5 by PWM control, an output voltage of the matrix converter apparatus becomes necessarily equal to or lower than the voltages across terminals of the second capacitor group 3. In this meaning, operation by the constitution of the general matrix converter apparatus of the background art is referred to as a step down operation or a step down control mode in the following.

Next, step up of the output voltage of the matrix converter apparatus will be explained. In FIG. 1, first, the first connecting/disconnecting means is closed and the second connecting/disconnecting means is opened. Next, a terminal of the reactor 2 on a side of the bidirectional switch is shortcircuited by the bidirectional switch. For example, both of the bidirectional switches S11 and S21 are made ON. By making S11 and S21 ON, at reactors 61, 62, a current by shortcircuit thereof flows and a magnetic energy is increased to be accumulated at the respective reactors. Next, the bidirectional switch S21 is made OFF, the accumulated energy is discharged, the discharged magnetic energy is charged to the first capacitor group to thereby realize to step up the output voltage of the matrix converter apparatus. Further, the respective reactors used here may be general reactors constituting the LC filter.

Here, the second connecting/disconnecting means is opened for preventing generation of a shortcircuit current flowing in an order of, for example, the second connecting/disconnecting means, the capacitor 31, the bidirectional switch S11, the bidirectional switch S21, a capacitor 32, and the second connecting/disconnecting means (there is not a current limiting element in a path in which the shortcircuit current flows), or preventing generation of a shortcircuit current flowing in an order of, for example, the second connecting/disconnecting means, the capacitor 31, the bidirectional switch S11, the capacitor 71, the first connecting/disconnecting means, the capacitor 72, the bidirectional switch S22, the capacitor 32, and the second connecting/disconnecting means (there is not a current limiting element also in the path) in accordance with ON/OFF operation of the bidirectional switch group 5.

When the bidirectional switch S21 is made OFF (S11 stays to be ON), a current flowing in the reactor 61 constitutes a charge/discharge current to and from the capacitor 71 to ensure a conduction path, by previously switching the bidirectional switch S22 or S23 ON, a current flowing in the reactor 62 becomes a charge/discharge current to and from the capacitor 72 or a charge/discharge current to and from the capacitor 73 to thereby ensure a conduction path, and a rapid variation in the current is restrained. That is, when a state of accumulating a magnetic energy by a shortcircuited state is shifted to a state of discharging the magnetic energy by making the bidirectional switch OFF, other bidirectional switch (corresponding to S22 or S23 in the above-described case) connected to a reactor (corresponding to the reactor 62 in the above-described case) connected to a bidirectional switch (corresponding to S21 in the above-described case) which is made OFF may previously be made ON.

The above-described operation is referred to as step up operation or a step up control mode in the following. In the step up control mode, ON/OFF controlling means (not illustrated) for outputting an ON/OFF control signal to the bidirectional switches carries out a step up operation by shortcircuitting and opening the bidirectional switch in accordance with the above-described switch operation sequence to drive the matrix converter apparatus while ensuring the conduction path.

A control mode can also be switched between the step up operation and the step down operation by the first, the second connecting/disconnecting means, and therefore, one unit of the matrix converter apparatus can deal with all of step down voltage output, step up voltage output, and regenerating operation to the side of the power source.

Figure 2:
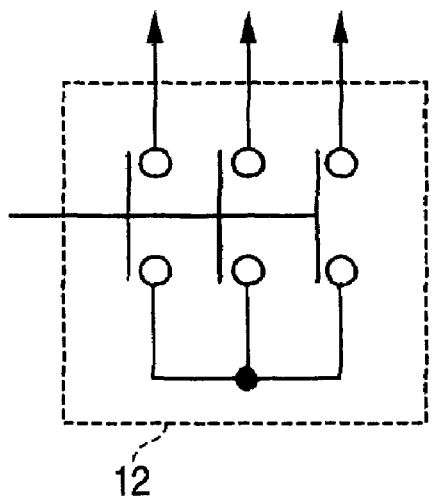
FIG. 2 is a constitution diagram of a mechanical type switch applied to firsts second connecting/disconnecting means.

Meanwhile, in switching from the step down control mode to the step up control mode, or switching from the step up control mode to the step down control mode, when the first, second connecting/disconnecting means are mechanical type switches 12 of relays, conductors or the like shown in FIG. 2, there is achieved an advantage of being operable inexpensively and at low loss. However, it is necessary to reduce conducted current in ON/OFF of the switch in consideration of an influence on machine life, further, the ON/OFF operation is slow and there is also a concern of generating chattering or the like in operating. Hence, in a case of the mechanical type switch, it is general to switch the mechanical type switch after awaiting for nullifying currents flowing in the first, the second connecting/disconnecting means. For example, there is carried out a switching processing of switching after stopping the motor 9, switching when an alternating current flowing in the switch constituting the connecting/disconnecting means crosses null, or switching after nullifying the current by making all of the bidirectional switches OFF regardless of presence/absence of rotation of the motor 9.

Embodiment 2

Figure 3:
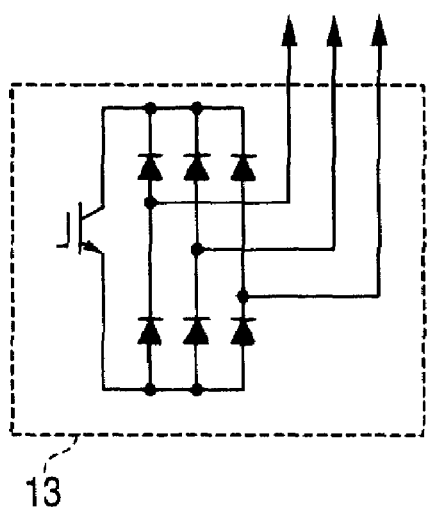
FIG. 3 is a constitution diagram of an electronic type switch applied to first, second connecting/disconnecting means as a second embodiment of the invention.

A second embodiment of the invention shown in FIG. 3 eliminates the above-described restriction by constituting the first, the second connecting/disconnecting means by an electronic type switch 13.

In FIG. 3, 6 diodes are connected to constitute a full-wave rectifying circuit and an IGBT transistor is connected across two positive and negative terminals of the full-wave rectifying circuit in parallel thereof. Regardless of any currents flowing in the first, the second capacitor groups, a current necessarily flows from a collector side to an emitter side of the IGBT transistor, and therefore, by making the IGBT transistor ON/OFF, the first, the second connecting/disconnecting means can be brought into a connected or a disconnected state.

Owing to the electronic type, a control mode can instantaneously be switched. For example, the control mode can instantaneously be switched immediately after making all of the bidirectional switches OFF, or when a snubber circuit is connected between the collector and the emitter of the IGBT transistor, the control mode can be switched instantaneously always in being operated regardless of presence/absence of the current.

Embodiment 3

Figure 4:
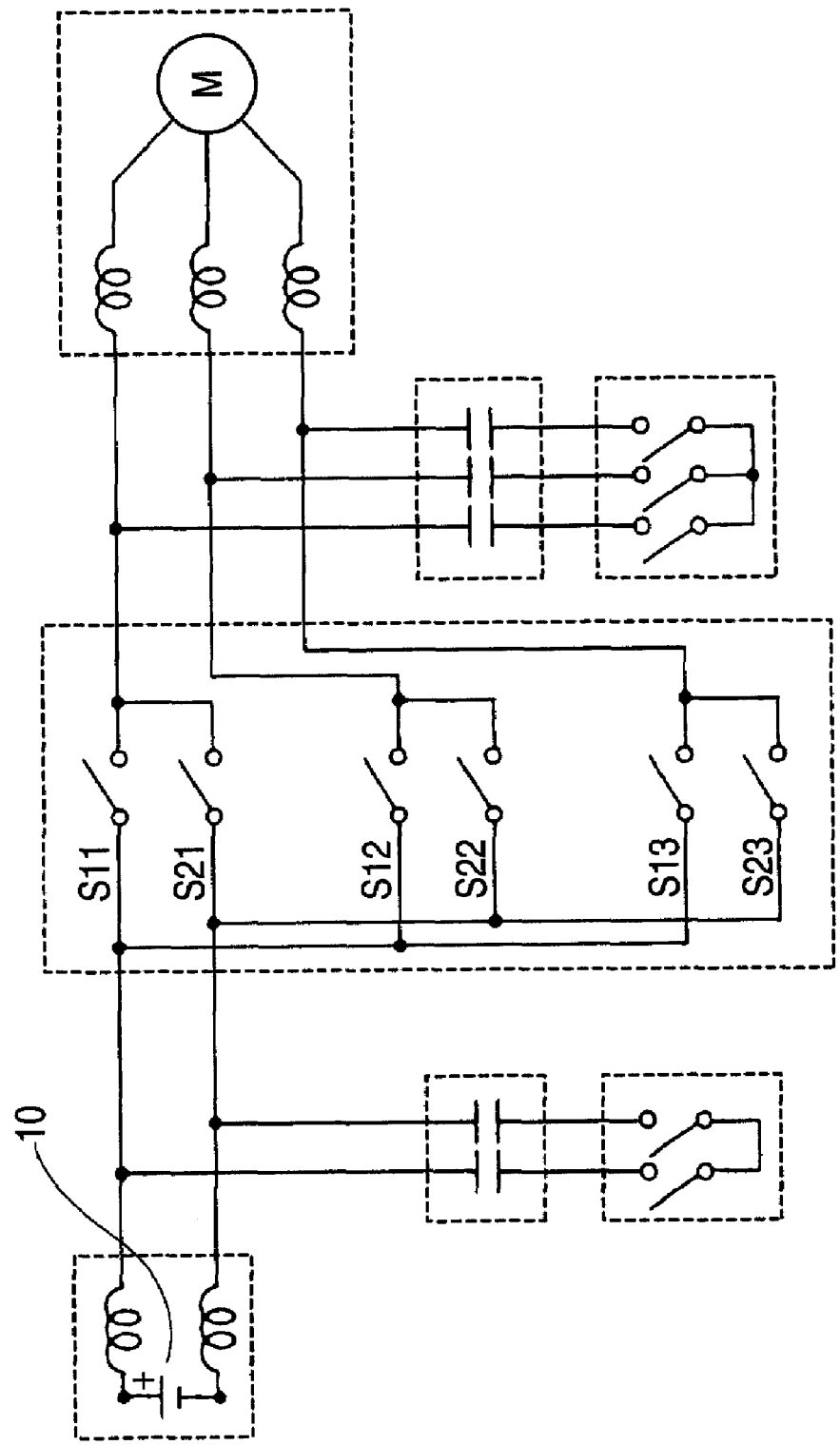
FIG. 4 is a constitution diagram of a matrix converter apparatus showing a third embodiment of the invention.

FIG. 4 shows a third embodiment of the invention. A direct current power source 10 is used in place of the three phase alternating current power source.

Similar to the first embodiment, by shortcircuitting the respective reactors on the input side by the bidirectional switches, the magnetic energy is increased to accumulate in the reactor, thereafter, the magnetic energy is discharged by making the bidirectional switches related to the shortcircuitting OFF, and the discharged magnetic energy is charged to the first capacitor group to thereby realize the step up voltage output. In the step down control mode, when brought into a regenerating operation state in which the power flows from the side of the motor 9, the power source can be regenerated from the matrix converter apparatus to the side of the direct current power source 10. When there are present two operation modes of a motor drive mode, the regenerating mode in actually operating the motor 9, the modes can fully be dealt with by a single apparatus and a contribution by being simple, small-sized, highly efficient, energy saving and the like can fully be expected.

Further, although according to the embodiment, the reactors are arranged at both of a positive terminal side and a negative terminal side of the direct current power source, even when the reactor is arranged only either one of the positive terminal side or the negative terminal sides a similar effect is achieved. In this case, in addition to be able to reduce the reactors to one, with regard to ensuring a continuity of the current flowing in the reactor, the continuity can be ensured when only one of the reactors is taken into consideration, and therefore, an effect of simplifying the control is also achieved.

Embodiment 4

Figure 5:
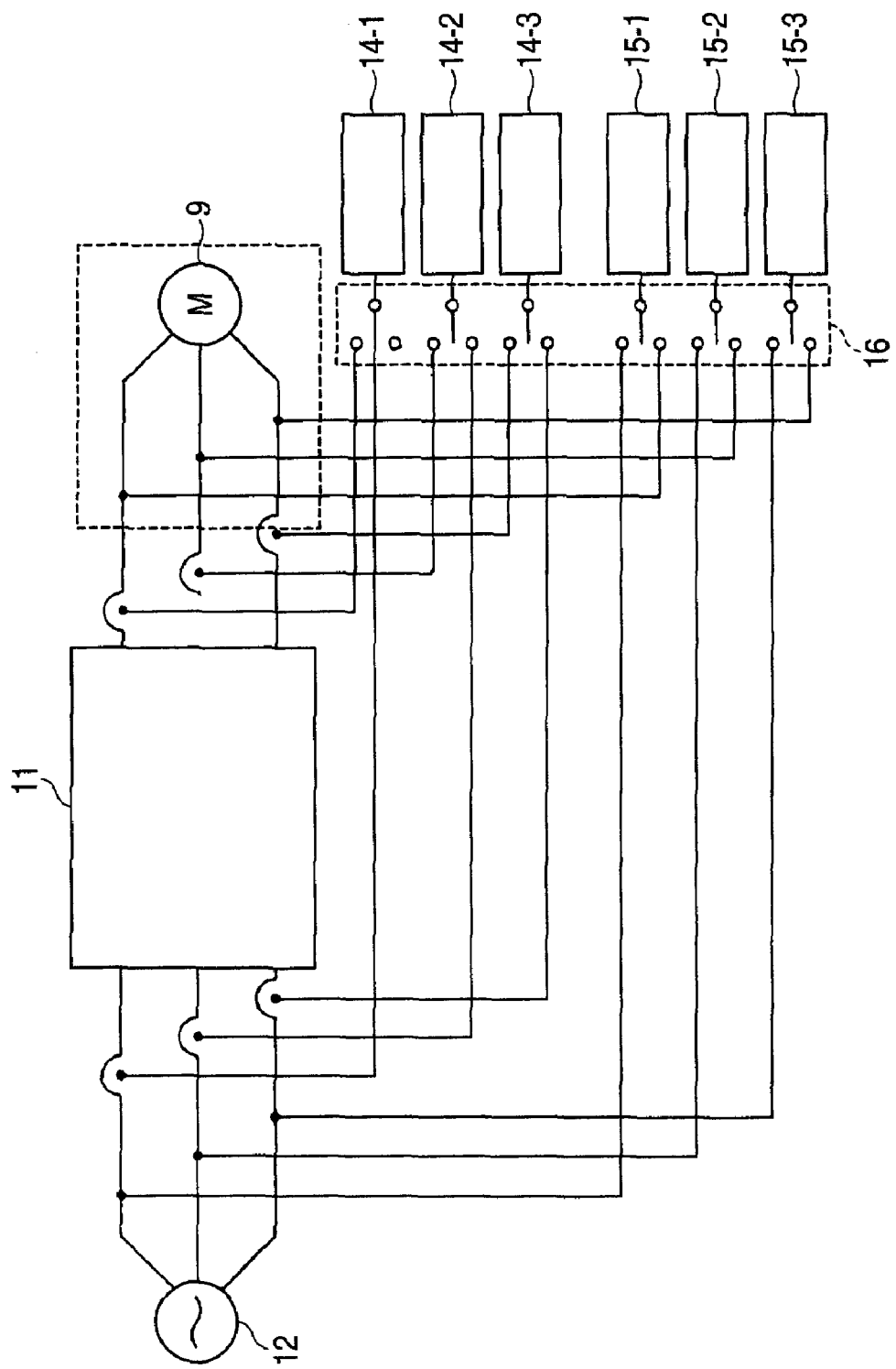
FIG. 5 is a constitution diagram of a matrix converter apparatus showing a fourth embodiment of the invention.

FIG. 5 shows a fourth embodiment of the invention.

In accordance with switching between the step down control mode and step up control mode, a position of a current, a voltage (detecting position) constituting an object of detection is switched.

With regard to detecting a voltage, an output side voltage of the matrix converter apparatus is made to constitute an object of detection in outputting the step up voltage, and a voltage on the side of the alternating current power source is made to constitute an object of detection in outputting the step down voltage.

In the step up operation, the output side voltage of the matrix converter apparatus constitutes a direct control object, and therefore, it is necessary to detect the output side voltage, in the step down operation, the output side voltage of the matrix converter apparatus becomes a pulse width modulating type voltage, rather than directly detecting the output side voltage, it is easy to detect the input side voltage and indirectly detect the output side voltage in accordance with pulse width control information.

Further, in detecting a current, an input current to the matrix converter apparatus is made to constitute a detection object when the step up voltage is outputted and the output current from the matrix converter apparatus is made to constitute the detection object in outputting the step down voltage.

It is useful to constitute the detection object by the output current in the step down operation when the output current is made to constitute directly the control object in vector control or the like and the output current is needed as information for controlling to commutate the output current otherwise. The input current is made to constitute the detection object in the step up operation because it is necessary to control the input current for controlling the step up output voltage.

In FIG. 5, notations 14-1, 14-2, 14-3 designate current detecting signals used for controlling the matrix converter apparatus and also notations 15-1, 15-2, 15-3 designate voltage detecting signals similarly.

In the case of the step up control mode, the current is set to detect the input side and is set to detect the voltage on the output side, the setting can be realized by setting to change all of the changeover switches 16 to lower stage sides in FIG. 5. In a case of the step down control mode, the current is set to detect the output side and is set to detect the voltage on the input side, the setting can be realized when all of the changeover switches 16 are set to change to upper stage sides in FIG. 4.

In this way, it is not necessary to carry out a complicated control change in accordance with switching the control mode by changing the position of the detection object of the current or the voltage in accordance with switching the control modes.

Embodiment 5

Figure 6:
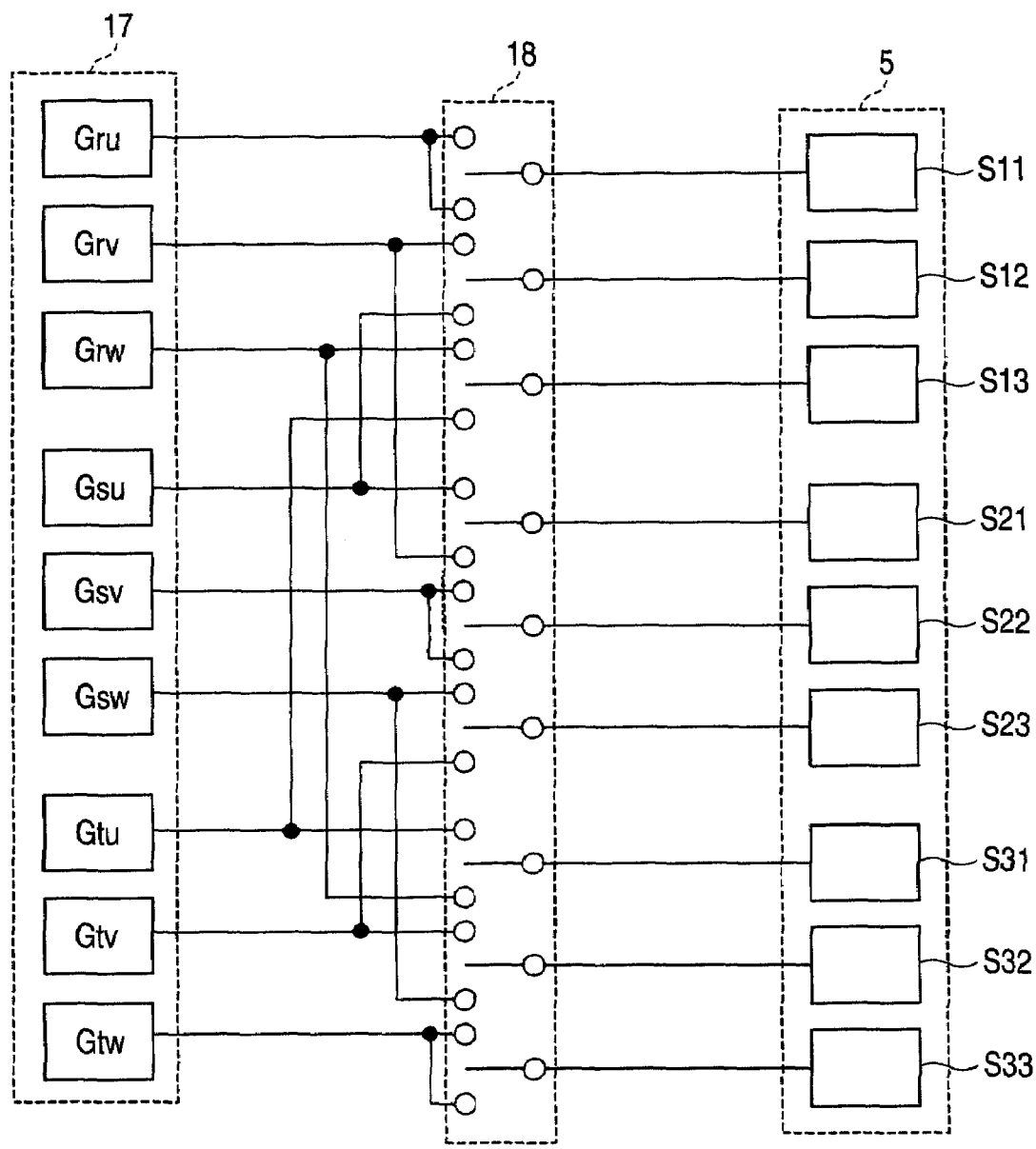
FIG. 6 is a constitution diagram of a matrix converter apparatus showing a fifth embodiment of the invention.

FIG. 6 shows a fifth embodiment of the invention.

Between a gate signal group 17 outputted from ON/OFF controlling means (not illustrated) as an ON/OFF control signal to bidirectional switches and a bidirectional switch group 5, a changeover switch 18 in correspondence with the signal is inserted.

The gate signal group 17 signifies 9 pieces of gate signals provided from an operator of CPU or the like as ON/OFF controlling means (when an example is taken by a matrix converter apparatus of three phase input three phase output) and the bidirectional switch group 5 is controlled by PWM control based on the gate signal group 17.

Meanwhile, when the control modes of step up and step down are switched, it is necessary to switch to an operation control in accordance with respective control modes. However, when the step down control mode and the step up control mode the circuit constitutions of which are totally reversed, by changing to arrange to allocate the gate signal by using the changeover switch 18, the control modes of step up and step down can be realized to switch without needing a special control or the like.

Figure 7:
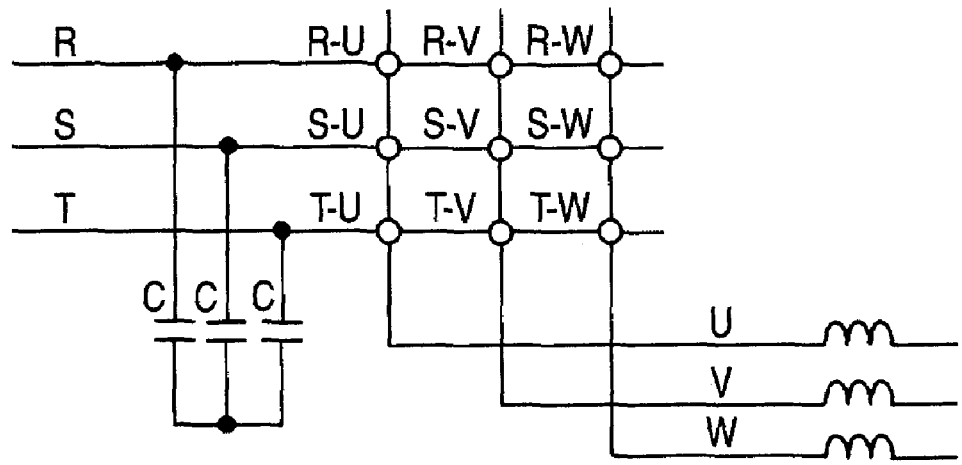
FIG. 7 illustrates diagrams of comparing circuit constitutions in a step down control mode and a step up control mode.
Figure 7:
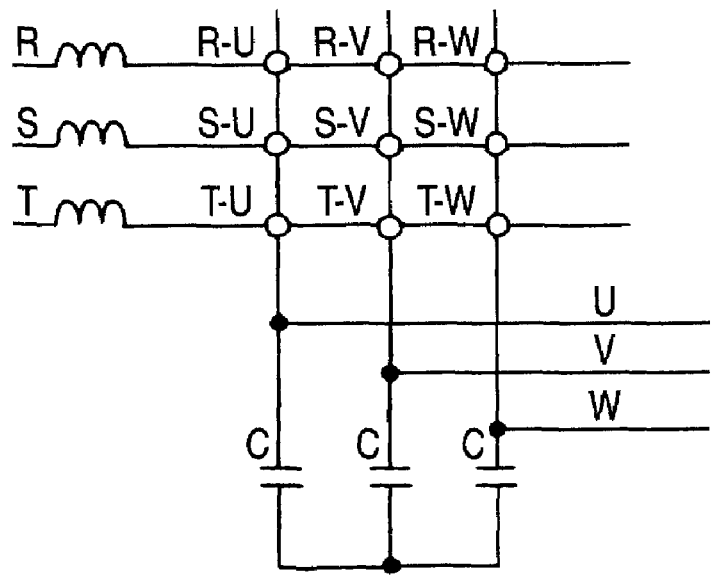
Figure 9:
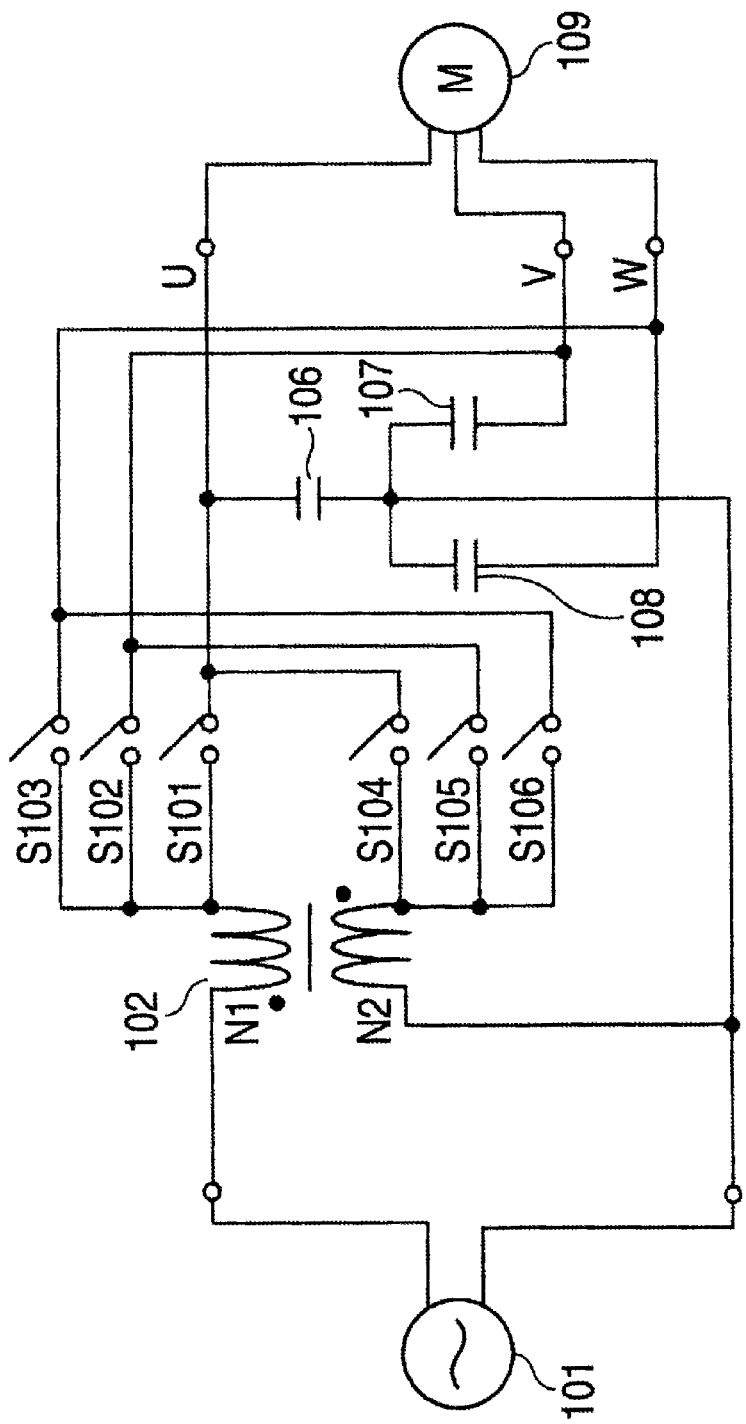
FIG. 9 is a constitution diagram of a matrix converter apparatus of a background art having a step up function.

As shown by FIG. 7, the step down control mode (case of FIG. 7(a)) and the step up control mode (case of FIG. 7(b)) are constructed by circuit constitutions in which positions of capacitors and reactors are totally reversely switched. Therefore, in switching the gate signals, a gate signal group supplied to the respective bidirectional switches in view from the power source side and a gate signal group supplied to the respective bidirectional switches in view from the motor side may be switched.

FIG. 7 shows the respective bidirectional switches as in R-U, R-V, R-W, S-U, S-V, . . . from a view point that the respective bidirectional switches correspond to intersections of R, S, T phases on the side of the three phase alternating current power source and U, V, W phases on the output side.

In line with such a way of thinking, a specific method of distributing to allocate the respective gate signals switching the control modes is shown in FIG. 8((a) column shows allocation in the step down control mode, (b) column shows allocation in the step up control mode).

For example, when the gate signal supplied to the bidirectional switch R-V (corresponding to S12 of FIG. 1) in correspondence with the intersection of the R phase and V phase in the step down control mode is switched to the step up control mode, the gate signal may be outputted to bidirectional switch U-S (equivalently, S-U, corresponding to S21 of FIG. 1) brought into a pairing relationship with R-V. This is provided by switching a side of notation R of the bidirectional switch R-V to U of the output side in correspondence therewith and switching a side of notation V to S on the input side in correspondence therewith. Further, as is known also from FIG. 8, it is not necessary to switch the gate signals to the bidirectional switches R-U, S-V, T-W.

The changeover switch 18 shown in FIG. 6 specifically realizes signal switching based on such a relationship. When all the switches are set to upper stage sides, the switches correspond to the step down control mode and when set to lower stage sides, the switches correspond to the step up control mode.

INDUSTRIAL APPLICABILITY

The invention relates to the matrix converter apparatus for outputting an arbitrary polyphase alternating current or direct current by constituting the input by the polyphase alternating current power source, particularly relates to the matrix converter apparatus having the function of stepping up and stepping down the output voltage.

Further, the invention relates to the matrix converter apparatus capable of realizing arbitrary voltage/arbitrary frequency realizing to step up the output voltage by using a standard reactor, further, capable of providing both of the step up voltage outputting function and the step down voltage outputting function, capable of realizing the regenerating function to the power source side and also capable of realizing to switch the step up operation and the step down operation even in the actual operation.

Further, the rapid change of the reactor current flowing in the bidirectional switch in the step up operation can be restrained, the surge voltage can be restrained from being generated, and therefore, a current capacity of the semiconductor switching element constituting the bidirectional switch can be reduced, and an effect of capable of preventing destruction of the semiconductor switching element can also be achieved.

Based on the characteristic, the matrix converter apparatus is applicable also to a use of requiring the voltage output higher than the input power source voltage, further, the apparatus is applicable by itself even when the two operation modes of the motor drive mode, the regenerating mode are present in the actual operation, and is applicable for a use needing to be simple, small-sized, highly efficient, energy saving or the like.

The invention claimed is:

1. A matrix converter apparatus for directly connecting respective phases of an alternating current power source and respective phases of an output side by means of respective bidirectional switches having a self arc suppression function, and controlled by a PWM control based on an output voltage instruction and outputting an arbitrary direct current or alternating current voltage, the matrix converter apparatus comprising:
respective reactors, each reactor constituted by one winding, connected between the respective phases of the alternating current power source and the bidirectional switches;

a first capacitor group constituted by respective capacitors for respectively connecting between U-phase and V-phase, V-phase and W-phase and W-phase and U-phase; U-phase, V-phase and W-phase being the phases of an output side directly connected by the bidirectional switches;

a circuit of stepping up an output voltage of the matrix converter apparatus by short-circuiting respective terminals connected to the bidirectional switches associated with two or more of the reactors by closing the directional switches, and thereafter opening the bidirectional switches; and a circuit for ensuring respective conduction paths of currents flowing in the respective reactors which have been short-circuited when the terminals are switched from being short-circuited to being opened.

2. The matrix converter apparatus according to claim 1, wherein the circuit of ensuring the conduction paths comprises:
the first capacitor group, and
the bidirectional switches.

3. A matrix converter apparatus for directly connecting respective phases of an alternating current power source and respective phases on an output side by means of respective bidirectional switches having a self arc suppression function and controlled by a PWM control based on an output voltage instruction, and outputting an arbitrary direct current or alternating current voltage, the matrix converter apparatus comprising:
respective reactors, each reactor constituted by one winding, connected between the respective phases of the alternating current power source and the bidirectional switches;

a first capacitor group constituted by respective capacitors for respectively connecting between U-phase and V-phase, V-phase and W-phase and W-phase and U-phase; U-phase, V-phase and W-phase being the phases of an output side directly connected by the bidirectional switches; and a first connecting/disconnecting circuit capable of connecting and disconnecting connections by means of the respective capacitors between U-phase and V-phase, V-phase and W-phase and W-phase and U-phase, wherein the first connection/disconnection circuit maintains the connections when a step up voltage of the matrix converter apparatus is outputted, and disconnects the connections when a step down voltage therefore is outputted.

4. The matrix converter apparatus according to claim 3, wherein the first connecting disconnecting circuit includes:
a first rectifying diode group constituted by a connection in parallel of three units, each of which comprises two diodes in series; and a first semiconductor switching element connected between positive and negative output terminals of the first rectifying diode group, terminals on one side of the respective capacitors constituting the first capacitor group are connected to the respective phases of the output side of the matrix converter apparatus, and terminals thereof on the other side are connected to the respective series connecting points of the first rectifying diode group.

5. A matrix converter apparatus for directly connecting respective phases of an alternating current power source and respective phases on an output side by means of respective bidirectional switches having a self arc suppression function and controlled by a PWM control based on an output voltage instruction and outputting an arbitrary direct current or alternating current voltage, the matrix converter apparatus comprising:
respective reactors, each reactor constituted by one winding, connected between the respective phases of the alternating current power source and the bidirectional switches;

a second capacitor group constituted by respective capacitors for respectively connecting between R-phase and S-phase, S-phase and T-phase and T-phase and R-phase; R-phase, S-phase and T-phase being the phases of an input side of the matrix converter apparatus; and a second connection/disconnection circuit capable of connecting and disconnecting connections by means of the respective capacitors between R-phase and S-phase, S-phase and T-phase and T-phase and R-phase, wherein the second connection/disconnection circuit disconnects the connections when a step up voltage of the matrix converter apparatus is outputted, and maintains the connections when a step down voltage thereof is outputted.

6. The matrix converter apparatus according to claim 5, wherein the second connecting/disconnecting circuit includes:
a second rectifying diode group constituted by a connection in parallel of three units, each of which comprises two diodes in series; and a second semiconductor switching element connected between positive and negative output terminals of the second rectifying diode group, terminals on one side of respective capacitors constituting the second capacitor group are connected to respective terminals connected to the bidirectional switch associated with the respective reactors, and terminals thereof on the other side are connected to the respective series connecting points of the second rectifying diode group.

7. The matrix converter apparatus according to claim 1, wherein a positive terminal side of a direct current power source is one phase and a negative terminal side thereof is the other phase so that the direct current power source is two-phase, and the direct current power source is substituted for the alternating current power source.

8. The matrix converter apparatus according to claim 1, wherein a positive terminal side of a direct current power source is one phase and a negative terminal side thereof is the other phase so that the direct current power source is two-phase, and each phase of the direct current power source is substituted for each phase of the alternating current power source, and the reactor is inserted to be connected only between either one of a positive terminal side and a negative terminal side of the direct current power source and the bidirectional switches.

9. The matrix converter apparatus according to claim 1, further comprising:

a detecting voltage switching apparatus for detecting the output voltage of the matrix converter apparatus when a step up voltage is outputted, and for detecting the alternating current power source voltage when a step down voltage is outputted.

10. The matrix converter apparatus according to claim 1, further comprising:
 a detecting current switching apparatus for detecting an input current to the matrix converter apparatus when a step up voltage is outputted, and for detecting an output current from the matrix converter apparatus when a step down voltage is outputted.

11. The matrix converter apparatus according to claim 1, further comprising:
 a gate signal outputting portion for outputting a gate signal based on an output voltage instruction; and
 a gate signal switching apparatus for changing to switch respective corresponding relationships between the bidirectional switch and the gate signal when a step down voltage is outputted and when a step up voltage is outputted.

12. The matrix converter apparatus according to claim 3, wherein
 a positive terminal side of a direct current power source is one phase and a negative terminal side thereof is the other phase so that the direct current power source is two-phase, and
 the direct current power source is substituted for the alternating current power source.

13. The matrix converter apparatus according to claim 3, wherein
 a positive terminal side of a direct current power source is one phase and a negative terminal side thereof is the other phase so that the direct current power source is two-phase, and
 each phase of the direct current power source is substituted for each phase of the alternating current power source, and
 the reactor is inserted to be connected only between either one of a positive terminal side and a negative terminal side of the direct current power source and the bidirectional switches.

14. The matrix converter apparatus according to claim 3, further comprising:
 a detecting voltage switching apparatus for detecting the output voltage of the matrix converter apparatus when a step up voltage is outputted, and for detecting the alternating current power source voltage when a step down voltage is outputted.

15. The matrix converter apparatus according to claim 3, further comprising:
 a detecting current switching apparatus for detecting an input current to the matrix converter apparatus when a step up voltage is outputted, and for detecting an output current from the matrix converter apparatus when a step down voltage is outputted.

16. The matrix converter apparatus according to claim 3, further comprising:
 a gate signal outputting portion for outputting a gate signal based on an output voltage instruction; and
 a gate signal switching apparatus for changing to switch respective corresponding relationships between the bidirectional switch and the gate signal when a step down voltage is outputted and when a step up voltage is outputted.

17. The matrix converter apparatus according to claim 5, wherein
 a positive terminal side of a direct current power source is one phase and a negative terminal side thereof is the other phase so that the direct current power source is two-phase, and
 the direct current power source is substituted for the alternating current power source.

18. The matrix converter apparatus according to claim 5, further comprising:
 a detecting voltage switching apparatus for detecting the output voltage of the matrix converter apparatus when a step up voltage is outputted, and for detecting the alternating current power source voltage when a step down voltage is outputted.

19. The matrix converter apparatus according to claim 5, further comprising:
 a detecting current switching apparatus for detecting an input current to the matrix converter apparatus when a step up voltage is outputted, and for detecting an output current from the matrix converter apparatus when a step down voltage is outputted.

20. The matrix converter apparatus according to claim 5, further comprising:
 a gate signal outputting portion for outputting a gate signal based on an output voltage instruction; and
 a gate signal switching apparatus for changing to switch respective corresponding relationships between the bidirectional switch and the gate signal when a step down voltage is outputted and when a step up voltage is outputted.

\* \* \* \* \*